Figures 1, 2:
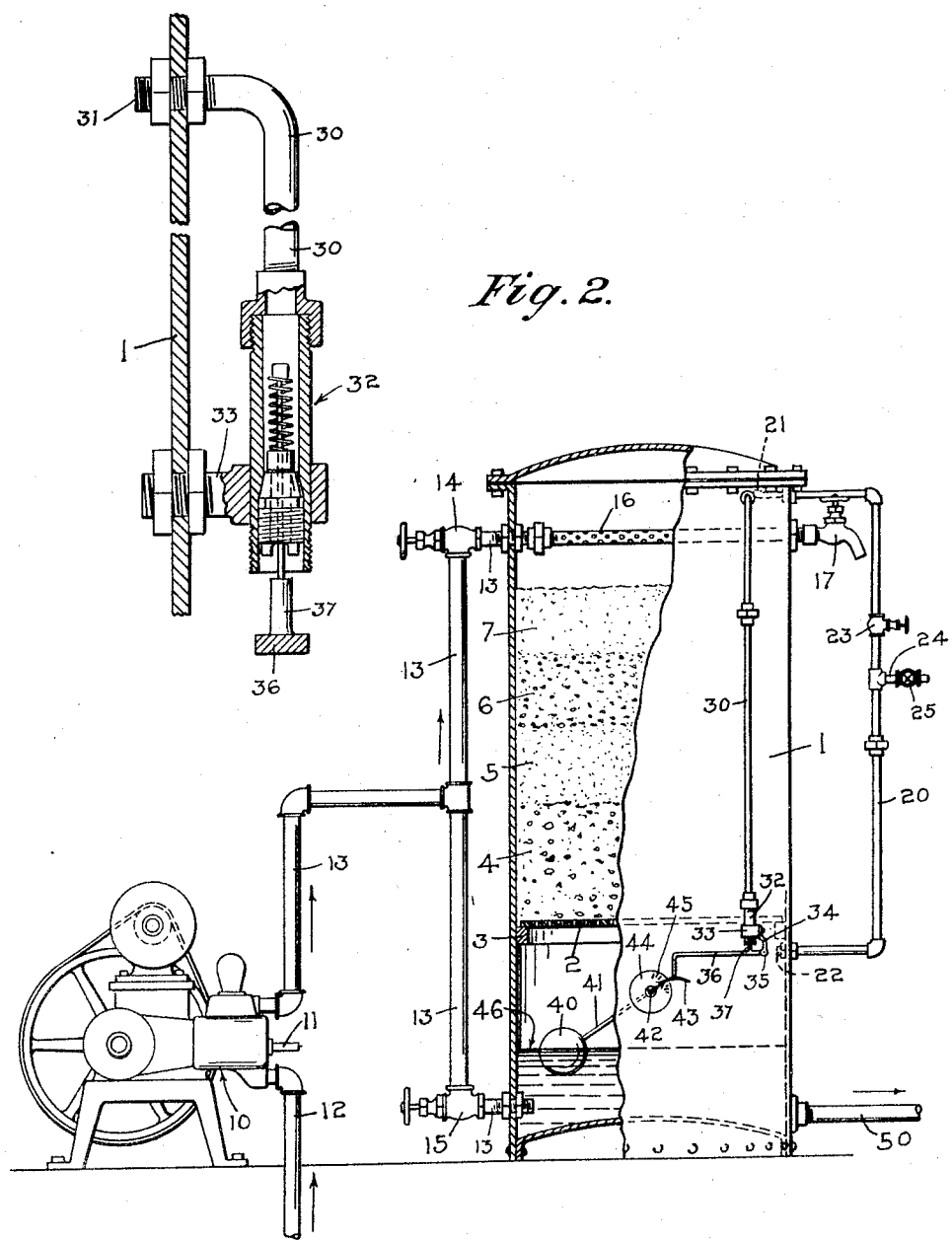

Oct. 15, 1929.  I. C. FITTS  1,731,409
FILTER
Filed Jan. 10, 1929

INVENTOR
Irving C. Fitts
BY J. L. Rivers,
ATTORNEY

Patented Oct. 15, 1929

1,731,409

UNITED STATES PATENT OFFICE

IRVING C. FITTS, OF MOUNT VERNON, WASHINGTON

FILTER

Application filed January 10, 1929. Serial No. 331,558.

This invention relates to improvements in filters of the type more particularly designed to filter water for domestic uses, but, as will appear, it may be also utilized for other purposes.

One object of the invention is, to provide a tank, having a filter bed, to which water and air during a filtering operation are continuously carried under equal pressure, controlled by an automatic pressure switch, and sprayed over the filter bed, the water, while in a diffused state, receiving an initial air scrubbing which serves to relieve it of impurities before it enters the filter bed, and as it is further purified by passing through the filtering material in said bed and until it reaches the bottom of the tank in a filtered condition, it is also subjected to the cleansing action of air.

Another object is, to provide an air-equalizing line whereby the air is maintained at equal pressure in the top and bottom of the tank, which permits the water to percolate through the filter bed by force of gravity, and prevents a water hammer on the material of the filter bed which might disrupt said material.

A further object is, to provide a pipe line communicating with the top of the tank and having an automatically controlled check valve, designed to relieve the tank of excess air and through which, in cooperation with the means for forcing water and air into the tank, the level of the filtered water may be maintained below the filter bed in a practically constant and safe manner, and also for releasing to the atmosphere foul air which might accumulate in the top of the tank.

A still further object is, to provide simple but effective means whereby the normal flow of water and air through the device may be reversed, and the tank, filter bed and spraying instrumentalities may be cleansed by a backwashing operation.

Other objects, advantages and capabilities will appear as the description of the invention progresses.

In the accompanying drawing—

Figure 1 is a side elevation of the device, showing the tank partly broken away and certain parts in section and broken away, a pump for water and air connected with the tank, and a pipe, broken away, connecting the pump with a source of water supply, being also shown; and, Fig. 2, a vertical sectional view of wall of tank and a pipe secured thereto, each being shown in broken sections, a check valve secured to the pipe, a support for the valve secured to said wall, the valve and support being partly sectionized, and a lever, in section, carrying a pin for opening the valve.

Referring more particularly to the drawing, 1 denotes a tank having a screen 2, supported therein as at 3, and which constitutes the bottom of the filter bed. In the present embodiment of the invention, the filtering material consists of a layer of gravel 4 disposed on said screen, and layers of sand 5, charcoal 6 and sand 7 superimposed thereon, but the arrangement of these elements may be varied, as for instance, by utilizing more and thinner layers of the sand and charcoal.

As illustrative of suitable means for supplying water and air to the filter, I provide a pump, generally designated as 10. Said pump is of the type commonly employed in private water systems, its pressure being under automatic switch control, and the pump is actuated by a motor. It is provided with an air intake valve 11, of the same construction as the valve shown in Fig. 2, and is designed to draw in water on its forward stroke, and draw in air through said valve on the back stroke. The inlet port of the pump is connected with the pipe 12 which communicates with a source of water supply, and the outlet port thereof connects with a pipe line 13, which is operatively connected with the tank, and through which water and air are pumped thereto. Said pipe line 13 is controlled by upper and lower valves, denoted as 14 and 15 respectively, the valves being of the ordinary globe type. A perforated pipe encased in a screen, which assembly is denoted as 16, is connected with the pipe line 13 and is disposed in the upper portion of the tank, the same being adapted to spray water and air over the filter bed as the same are pumped to said portion of the tank. A faucet 17, operatively connected with said perforated pipe and extending exteriorly of the tank, is utilized for a purpose which will be described in order.

What I term the air-equalizing line, designated as 20, is operatively mounted to the tank, its upper and upstanding terminal 21 being disposed in the upper portion of the tank and its lower and horizontal terminal 22 being located in the lower portion of the tank and below the screen 2. It is controlled by a globe valve 23 and its primary function, as its name indicates, is to equalize the air pressure in the tank for the purposes heretofore referred to and also expedite the passage of water to the bottom of the tank while the filtration thereof takes place. This line, serving as it does to prevent a flooded condition on top of the filter bed with a consequent avoidance of water hammer and the driving of sand through the materials below it, permits the use in the filter bed of a much finer sand and a larger quantity of it and more charcoal than would be practical under other conditions, where air under pressure might be utilized as a cleansing agent. Said line is provided with a pipe 24, likewise controlled by a globe valve 25, which may be used, if desired, as a source of air supply for outside purposes, as for instance, in providing air to a storage tank for filtered water.

Another pipe line, denoted as 30, has one end 31 secured to and disposed within the upper portion of the tank, said end being located above the spraying device 16, and its other end is operatively connected with a check valve, generally designated as 32, said valve being held in place exteriorly of the tank by the support 33 secured to the wall thereof. 34 denotes a support, secured to the support 33, and 35 pivot means, which provide a pivotal connection for a lever 36 having an upstanding pin 37 adapted to contact with the valve stem and open the valve when said lever is raised at its free end, and the lever, by virtue of said pivotal connection and its weight, serving to drop down and permit the valve to close when the lever is released. The valve is automatically controlled by a float 40 having a stem 41 disposed interiorly of the tank, said stem being fixedly secured to a shaft 42, rotatably mounted to the tank. The shaft 42 also carries fixedly secured thereto a trip lever 43 adapted to act on the lever 36. The lever 43 works over a dial 44 through which said shaft extends, the lever also serving as an indicator, in connection with indicia 45 on the dial, to show the level of the filtered water 46 in the bottom of the tank. The valve shown in Fig. 2 is of common construction, but check valves of other types may be employed, if deemed desirable.

For the purpose of illustrating the workings of the pipe line 30 and the instrumentalities immediately associated therewith, the approximate maximum level attained by the filtered water is placed as indicated by 46, it being assumed that when the water reaches this level the maximum pressure of the pump permitted by the automatic pressure switch has also been reached and the pump discontinues the pumping of water and air. When said level is lowered by the user withdrawing such water from the filter through the outlet pipe 50 or the water being thereby conveyed to a storage tank, as is commonly employed in connection with a device of this kind, the float and the mechanism cooperating therewith are ready to act on the valve 32. The lowering of said level, as is obvious, carries the float downwardly, causing the trip lever 43 to exert an upward thrust on the lever 36, serving to open the valve, as heretofore described, and release air from the filter. When the air pressure in the filter is thus reduced, the pump starts operating again and when said maximum level of filtered water is again attained, a reversal of the cycle of operations described will take place, the valve will close, and the same will remain closed until the excess air in the tank is again discharged automatically and in the manner first described.

Said pipe line and instrumentalities in addition to their utility in releasing contaminated air from the tank, as heretofore referred to, provide positive means whereby said level may be maintained safely below the filter bed so that the filtered water may not return to the filter bed and be contaminated thereby, and they also provide like means for keeping water in the bottom of the tank so that the filter will function at its highest efficiency; at the same time being instrumental in preserving an air seal between the filter bed and said level. Where a storage tank is utilized in connection with the filter it is desirable that the water may not get so low in the tank of the filter that said air seal would blow out through the outlet pipe 50 and into the storage tank, and the means just referred to contribute in preventing such a result.

In operating the device, water and air under equal pressure are supplied to the filter by the pump 10 having the air intake valve 11, said pump operating under an automatic pressure switch and whereby the pump is adapted to start or stop within predetermined pressure limits for water and air. The valve 14 being open and the pipe line 20 affording free communication for air between the upper and lower portions of the tank, the valve 15 and faucet 17 being closed, and the outlet pipe 50 being operatively connected up as desired, water and air are forced by the pump through the pipe line 13 to the spraying device 16 where the same are sprayed over the filter bed. The water, aerated as described, then seeks its way through said bed and drops to the bottom of the filter in a filtered condition, where it may be discharged through said outlet pipe. The pipe line 20 serves to equalize the air pressure in the top and bottom portions of the tank, with the beneficial results heretofore enumerated, and the pipe line 30 with the mechanism immediately associated therewith automatically discharges excess and foul air from the tank with the attendant advantages as have been detailed.

When it is desired to clean the filter, the flow of water and air from the pump to the filter may be reversed and the filter backwashed by closing the valve 14 and opening the valve 15, and also opening the faucet 17 and connecting it with a sewer or sump by a hose or in any other suitable way, and a cap may be screwed on the valve 32 to close it entirely during the backwashing operation if deemed necessary. Water and air may be then pumped to the lower portion of the filter at the same pressure as when it was first introduced into the filter under normal operation, and the filter will be cleaned by water and air rising through the filter bed and through the perforated pipe and screen 16 to said faucet from which the same are discharged, the filter being indicated as cleaned when the discharge coming through the faucet is clear. In this operation, the screen on said pipe obviously receives water and air in a direction opposite to that of normal operation and is thereby cleaned of any extraneous substances, as slime or the like, which would tend to accumulate more particularly on the under portion of the screen during the filtering operations, but, as is evident, the backwashing operation through the flow of water and air will be effective in cleaning said screen in its entirety. The screen, during this operation, is useful in preventing materials from the filter bed from being forced out through the faucet.

If desired, a sterilizing agent such as chlorine or potassium permanganate may be utilized in connection with the water and air in backwashing the filter, the same being introduced at the pump or in the pipe line 13, by any suitable means, to the end that a most effectual cleansing of the filter may be obtained.

Upon the removal of the discharge connection for the faucet and with the faucet still open, the residue of unfiltered water remaining in the filter may be drained off through the pipe 50. The faucet then being closed, said cap to the valve 32, if one had been used, likewise being removed, and the valves 14 and 15 being respectively opened and closed, the filter is in condition for normal operation, as described, and when the dial 44 indicates that the level 46 of the filtered water has been attained the filter will again function in the manner heretofore detailed.

While I have shown the filter as connected up with a pump for water and air, it may be utilized in connection with a water main under pressure and an air compressor, and it may also be employed in filtering liquids other than water.

As will be obvious to those skilled in the art, other changes in and modifications of the arrangements and constructions described may be made without departing from the spirit of my invention or sacrificing its advantages, hence it is desired that I be not confined to those specifically set forth.

I claim:

1. A device of the class described, comprising a tank having a filter bed and upper and lower portions disposed above and below said bed to permit the entrance of water and air, a pipe line communicating with said portions, means for forcing water and air into the tank through said line, a cut-off valve in said line for each of said portions, a perforated pipe encased in a screen communicating with said line and located in said upper portion, a faucet connected with the last-named pipe and extending exteriorly of the tank, a second pipe line communicating with said portions for equalizing air pressure in the portions, a third pipe line communicating at one end with said upper portion, a check valve operatively connected with the other end of said third line, means for automatically releasing air from the tank through the last-named valve, and outlet means for the tank.

2. In a filter having a tank provided with outlet means, a filter bed and upper and lower portions disposed above and below said bed to permit the entrance of water and air; a pipe line communicating with said portions, means under automatic pressure switch control for forcing water and air into the tank and under equal pressure, means for spraying water and air from said line over the filter bed, a second pipe line communicating with said portions for equalizing air pressure in the portions, a third pipe line communicating at one end with said upper portion, a check valve disposed at the other end of said third line, and means for automatically releasing air from said upper portion through the last-named valve.

3. In a filter, a tank having a filter bed, a pipe line for conveying water and air to the tank and above said bed, means for supplying water and air under pressure to said line, means connected with said line for spraying water and air over said bed, a second pipe line connected with the tank adapted to equalize air pressure in the upper and lower portions of the tank, a third pipe line communicating at one end with the upper portion of the tank, a valve disposed at the other end of said third line, and means for automatically opening said valve to release air from the upper portion of the tank to the atmosphere.

4. In a filter, a tank having a filter bed, a pipe line for conveying water and air to the tank and above said bed, means, including an automatic pressure switch, for supplying water and air under equal pressure to said line, means associated with said line for spraying water and air over said bed, a second pipe line adapted to equalize air pressure in the tank, a third pipe line communicating with the upper portion of the tank, a check valve operatively connected with the third pipe line, and means for automatically opening said valve and thereby releasing air from the tank to the atmosphere when filtered water in the bottom of the tank reaches a level below the maximum permitted by the first-named means.

5. In a filter, the combination of a tank having a filter bed spaced away from the top and bottom of the tank, means, controlled by an automatic pressure switch, for forcing water and air into the tank, means for spraying water and air over the filter bed, a pipe line adapted to equalize air pressure in the tank above and below the filter bed, and means for automatically relieving the tank of excess air pressure.

6. In a filter, the combination of a tank having a filter bed spaced away from the top and bottom of the tank, means, controlled by an automatic pressure switch, for forcing water and air into the tank under equal pressure, means for spraying water and air over the filter bed, and a pipe line, controlled by a cut-out valve, adapted to equalize air pressure in the tank above and below the filter bed.

7. In a filter having a tank provided with a filter bed spaced away from the top and bottom of the tank and means, controlled by an automatic pressure switch, for forcing water and air into the tank; a pipe line communicating at one end with the tank and above the filter bed, a check valve operatively connected with the other end of said line, and means, including a float disposed below the filter bed, adapted to automatically open said valve and thereby release air from the tank to the atmosphere when the maximum level of filtered water permitted by the first-named means and said switch is lowered, and to permit said valve to close when said maximum is attained.

8. In a filter having a tank, means for forcing water and air into the tank, a filter bed and upper and lower portions disposed above and below said bed to permit the entrance of water and air; a pipe line communicating at one end with said upper portion, the free terminal of the pipe at said end being upstanding, the other end of the pipe line communicating with said lower portion, a cut-out valve in said line, the pipe line being adapted to equalize air pressure in said portions, and a pipe connected with said line and having a cut-out valve to provide air under pressure for a storage tank for filtered water.

9. In a filter having a tank, means for forcing water and air into the tank, a filter bed and upper and lower portions disposed above and below said bed to permit the entrance of water and air; a pipe line communicating with each of said portions and controlled by valve means, adapted to equalize the air pressure in said portions and prevent a water hammer on said bed.

IRVING C. FITTS.